US007303385B2

(12) United States Patent
Yang et al.

(10) Patent No.: US 7,303,385 B2
(45) Date of Patent: Dec. 4, 2007

(54) HEATING TOOL FOR SHAPING SOFT MATERIALS AND SHAPING APPARATUS USING THE SAME

(75) Inventors: Dong Yol Yang, Daejeon (KR); Hyo Chan Kim, Jeonju (KR); Sang Ho Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 315 days.

(21) Appl. No.: 11/043,766

(22) Filed: Jan. 26, 2005

(65) Prior Publication Data

US 2005/0199607 A1 Sep. 15, 2005

(30) Foreign Application Priority Data

Mar. 12, 2004 (KR) ..................... 10-2004-0016967

(51) Int. Cl.
*B29C 67/00* (2006.01)
*B29C 35/00* (2006.01)

(52) U.S. Cl. ...................... 425/216; 219/216; 219/221; 425/471; 425/472

(58) Field of Classification Search ................ 425/215, 425/174, 383, 403, 470, 471, 472, 216; 219/228, 219/221, 201, 216; 83/15, 171
See application file for complete search history.

(56) References Cited

U.S. PATENT DOCUMENTS 3,711,211 A * 1/1973 Garrison ..................... 219/229
3,821,513 A * 6/1974 Christensen ................ 219/233
6,119,567 A * 9/2000 Schindler et al. ............. 83/171
6,234,725 B1 5/2001 Campian
2005/0017411 A1* 1/2005 Yang et al. ................. 425/174
2007/0026100 A1* 2/2007 Yang et al. ................. 425/472

FOREIGN PATENT DOCUMENTS

KR 2003-0004638 1/2003

* cited by examiner

*Primary Examiner*—Robert B. Davis
(74) *Attorney, Agent, or Firm*—Brinks Hofer Gilson & Lione

(57) ABSTRACT

A heating tool for shaping a soft material is provided. The heating tool is mounted to a predetermined position of a shaping apparatus and connected to a power source provided at a predetermined position of the shaping apparatus to melt and shape the soft material under a high temperature. The heating tool includes shaping parts which come in contact with the soft material to melt the soft material, and heating parts which are provided to be in non-contact with the soft material. The heating parts collect the molten soft material and thermally decompose the molten soft material. The heating tool enables a surface of the soft material to be perfectly thermally decomposed. Thus, the present invention prevents the soft material from being undesirably deformed, due to the molten material remaining after a shaping process.

16 Claims, 4 Drawing Sheets

(A) (B)

HEATING TOOL FOR SHAPING SOFT MATERIALS AND SHAPING APPARATUS USING THE SAME

PRIORITY CLAIM

This application claims under 35 U.S.C. § 119 the benefit of the filing date of Mar. 12, 2004 of Korean Application No. 10-2004-16967, the entire contents of which are incorporated herein by reference.

BACKGROUND

1. Technical Field

The present invention relates to a tool and an apparatus for shaping soft materials, such as a foam material, and more particularly, to a heating tool which a surface of a workpiece melted rapidly and the molten surface has thermally decomposed.

2. Description of the Related Art

Generally, methods of shaping soft materials, such as a foam material, may be classified into two types: a method of cutting the soft material using a cutting tool, and a method of melting a soft material by using a heating tool.

The cutting method using the cutting tool always generates chips during a cutting process. The chips may be scattered about a shaping apparatus, but most of the chips are built up on a cutting path, thereby hindering the movement of the cutting tool. Thus, this method has a problem in that the precision becomes low. In order to solve the problem, U.S. Pat. No. 6,234,725 discloses that an evacuation bore drawing air is provided on a predetermined portion of the cutting tool. The evacuation bore draws the chips generated during the cutting process along with the air. Such a method allows the chips to be easily evacuated, but is disadvantageous in that a chip removal rate is not high, so that a working environment is not greatly improved. Further, the evacuation bore may cause a defect on a surface of a workpiece.

To the contrary, the melting method using the heating tool shapes a soft material by melting the soft material and does not generate the cutting chips. The method using the heating tool is found in Korean Patent Laid-open Publication No. 2003-4638 and Korean Patent Application No. 2003-47255, which are incorporated herein by reference.

FIG. 1 shows a conventional heating tool used for the melting method. As shown in FIG. 1, the conventional heating tool 10 is provided with a very thin hot wire 11. The hot wire 11 generates heat with a high temperature of 700° C. or higher, when a voltage is applied to the heating tool 10. Thus, when the hot wire 11 approaches workpiece made from a soft material, a surface of the workpiece is melted by radiant heat emitted from the hot wire 11. Such method has an advantage in that the workpiece can be shaped without coming in direct contact with the heating tool 10. As a result, there is no cutting resistance due to contact friction between the workpiece and the heating tool 10. Further, the shaping method has another advantage in that the hot wire is thin and radiant heat is restricted within a narrow range, thus ensuring a more precise shaping, as compared to the former method using the cutting tool.

However, the conventional heating tool has a problem in that thermal energy is transmitted to the workpiece via the hot wire having a very small surface area, so that the shaping process takes a long time. Thus, when such a heating tool is used at a preliminary shaping stage in which a large area is processed, only a localized part of a workpiece is thermally decomposed, and a large part of the workpiece remains molten. Further, the molten material may be adhered to the workpiece or the heating tool, thus deteriorating a surface roughness of the workpiece and lowering precision of the heating tool. Accordingly, there is a need to provide a heating tool for shaping soft materials, capable of rapidly shaping a large area of a workpiece without generating cutting chips. There is also a need to provide a shaping apparatus using the heating tool, which is capable of shaping a workpiece in three dimensions using the heating tool.

BRIEF SUMMARY

The present invention provides a heating tool for shaping a soft material by melting the same under a high temperature, the heating tool being mounted on a predetermined position of a shaping apparatus and connected to a power source provided on the shaping apparatus. The heating tool includes a shaping part contacting with the soft material to melt the same to produce a melted soft material, and a heating part for collecting the melted soft material produced by the shaping part and thermally decomposing the melted soft material, wherein the heating part does not contact with the soft material.

The present invention further provides a shaping apparatus for fabricating a 3 dimensional shape using a soft material. The shaping apparatus includes a feeding unit for moving in three different directions independently which are perpendicular to each other, an indexing table for supporting the soft material in a manner that the soft material rotates about at least one axis, and a heating tool mounted to the feeding units. The heating tool including a shaping part contacting with the soft material to melt the same to produce a melted soft material, and a heating part for collecting the melted soft material produced by the shaping part and thermally decomposing the melted soft material, wherein the heating part does not contact with the soft material.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF PREFERRED EMBODIMENTS

Hereinafter, embodiments of the present invention will be described in detail with reference to the attached drawings.

Figure 1:
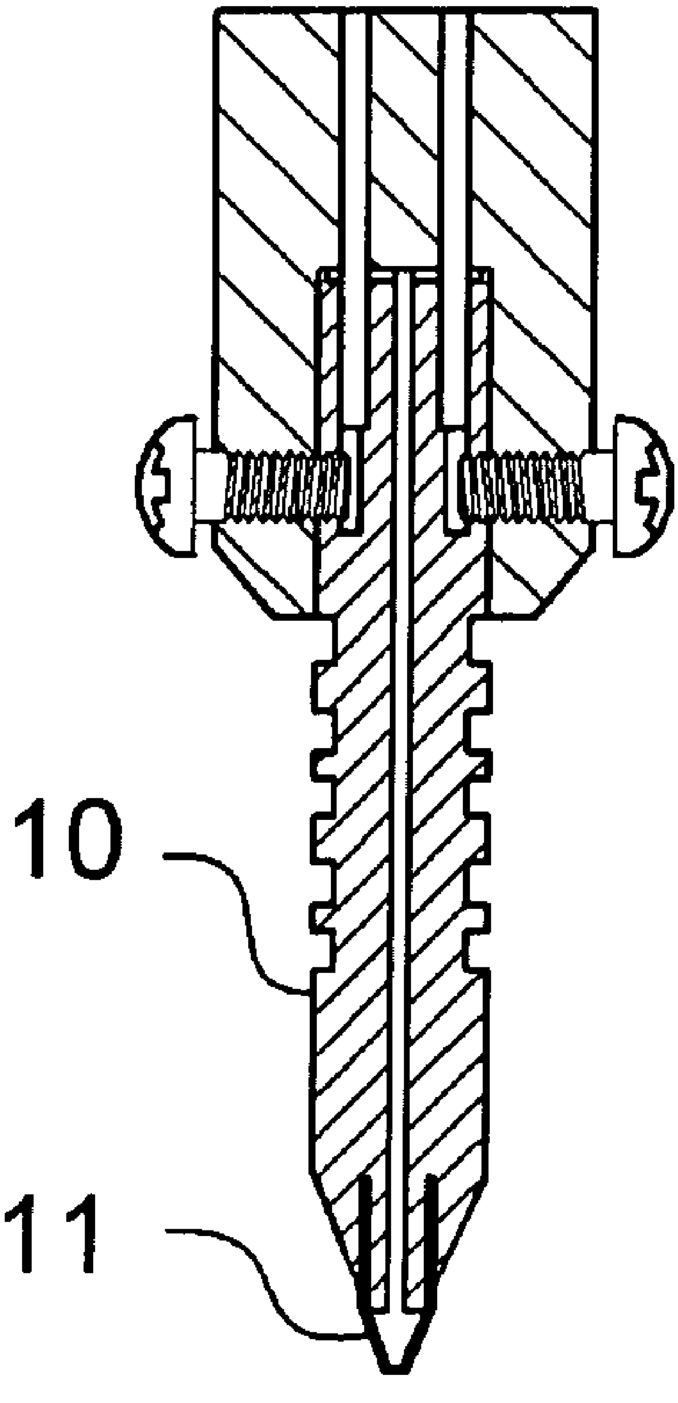
FIG. 1 Prior Art
FIG. 1 is a sectional view of a conventional heating tool.
Figure 2:
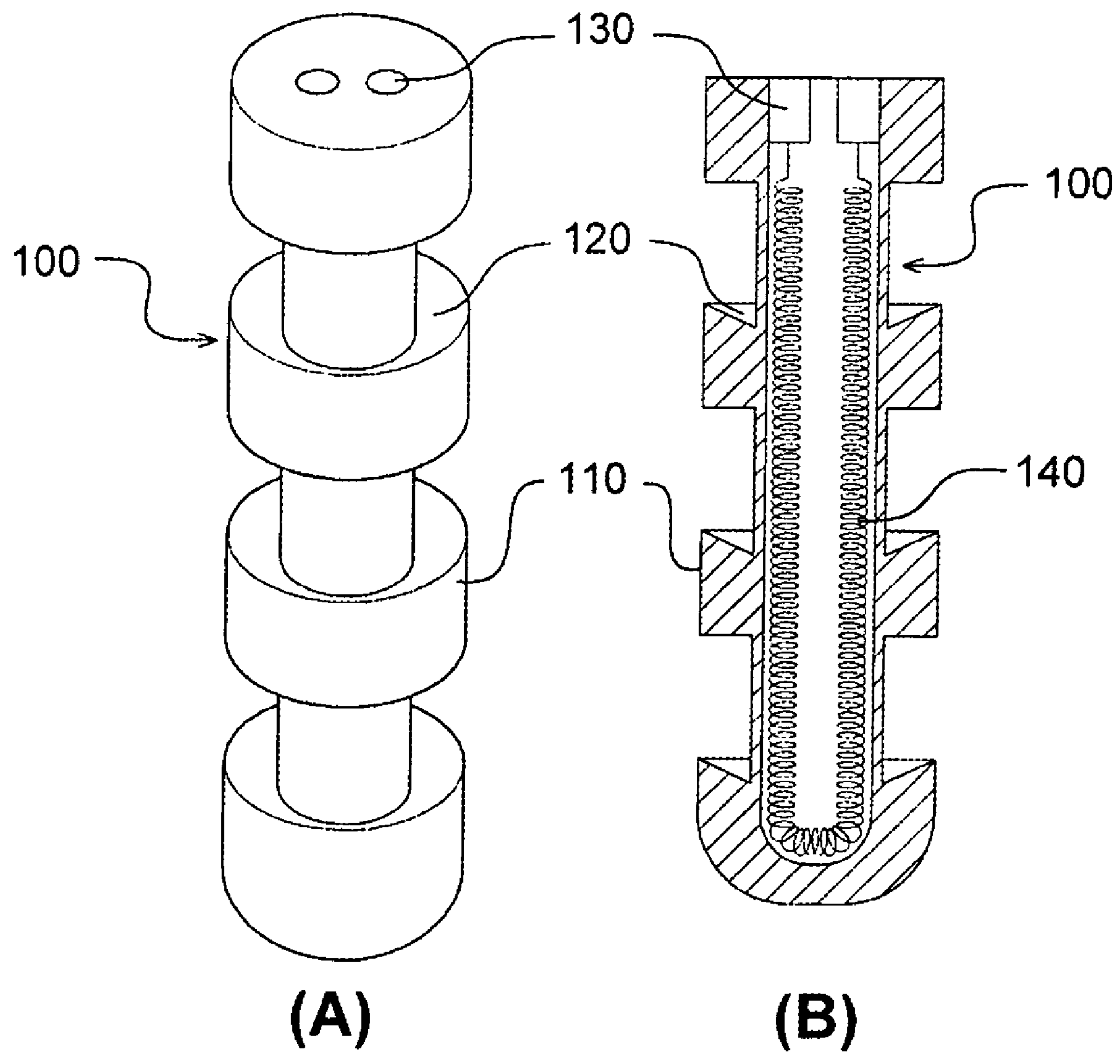
FIG. 2*a* is a perspective view of a heating tool and FIG. 2*b* is a sectional view of the heating tool.

FIGS. 2*a* and 2*b* show a heating tool, according to an embodiment of the present invention. FIG. 2*a* is a perspective view of the heating tool and FIG. 2*b* is a sectional view of the heating tool.

As shown in FIGS. 2*a* and 2*b*, the heating tool 10 has a shape similar to a rod, and includes shaping parts 110 and heating parts 120. Each of the shaping parts 110 is projected in a radial direction of the heating tool 10, and each of the heating parts 120 is provided inside an associated shaping part 110.

Each shaping part 110 is in contact with a workpiece to melt the workpiece, and has a shape of a ring with a predetermined thickness. The shaping parts 110 are longitudinally arranged along the heating tool 100 at regular intervals. Each heating part 120 corresponds to a cavity formed on an inclined upper surface of an associated shaping part 110, as shown in FIG. 2*b*. Each heating part 120 heats a soft material which is melted by each shaping part 110 and thermally decomposes the soft material.

Generally, an exothermic temperature of the heating tool 100 is about 400° C., which is sufficient to melt and thermally decompose the workpiece made of the soft material. However, a contact area between the heating tool 100 and the workpiece is small, so that a quantity of heat transmitted to the workpiece is also small. Thereby, the quantity of heat and time are insufficient to melt and thermally decompose a large surface at one time. In order to increase the quantity of heat, a method to raise the temperature of the heating tool 100 is proposed. However, such a method is problematic in that the workpiece may be excessively melted by radiant heat, and the precision may be reduced. Thus, according to the embodiment, the workpiece is melted by the shaping parts 110, and then the molten workpiece is heated by the heating parts 120 for a sufficient period so that the workpiece is completely thermally decomposed.

Further, electrodes 130 are provided on a top of the heating tool 100 to be connected to an external power source. A resistance coil 140 is connected to the electrodes 130. Thus, when the heating tool 100 is mounted to a shaping apparatus and the electrode 130 is connected to the external power source, the resistance coil 140 emits heat to thereby heat the heating tool 100.

The shaping processes using the heating tool 100 will be described in the following in detail.

First, the heating tool 100 comes in contact with a portion of a workpiece to be shaped. At this time, heat is directly transmitted from the heating tool 100 to the workpiece, thus melting a surface of the workpiece contacting the heating tool 100. A portion of the molten material is immediately thermally decomposed, whereas the rest of the molten material is collected in the heating part 120 provided in the upper surface of each shaping part 110 so as to be heated. The molten material collected in the heating parts 120 is continuously heated during the movement of the heating tool 100, thus being thermally decomposed. Therefore, the heating tool 100 allows a surface of the workpiece contacting the heating tool 100 to be completely thermally decomposed, thus preventing generation of wastes.

As shown in FIG. 2*b*, each heating part 120 is positioned nearer to the resistance coil 140, than the corresponding shaping part 110. Thus, the heating parts 120 are higher than the shaping parts 110 in temperature, allowing the thermal decomposition of the molten workpiece to be easier and thereby faster. Alternatively, or additionally, radiant heat is emitted, so that it is possible to melt the workpiece in a non-contact method.

Figure 3:
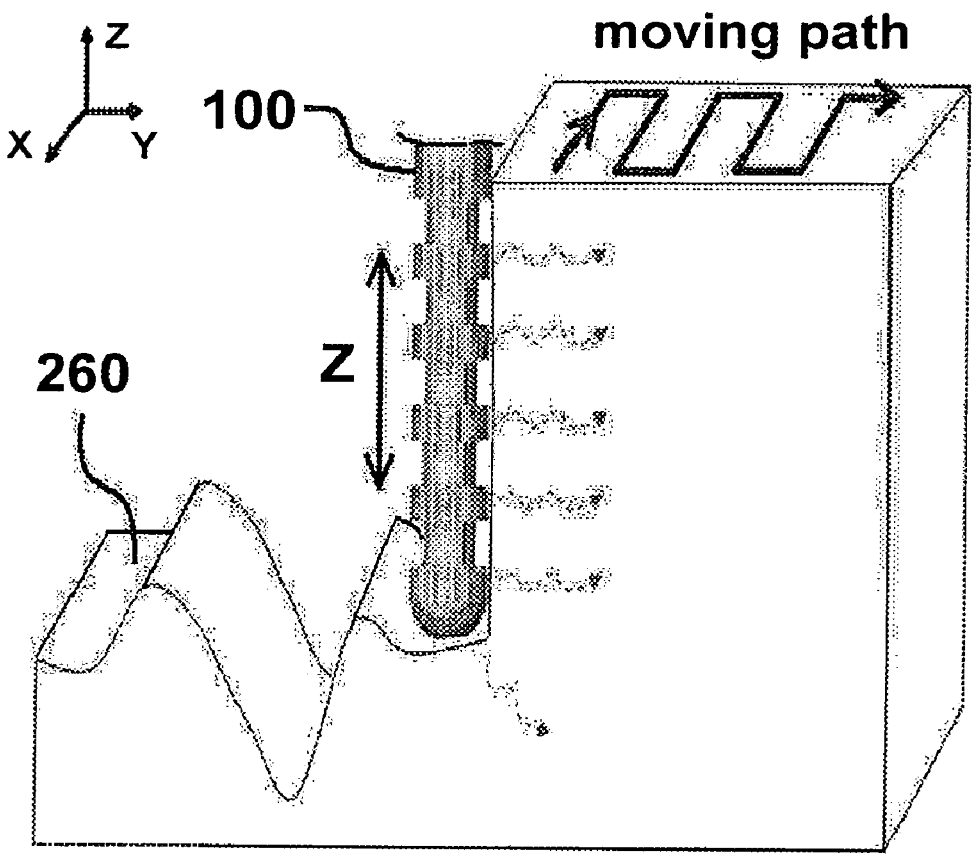
FIG. 3 is a view of a shaping process using the heating tool of FIGS. 2*a* and 2*b*.
Figure 4:
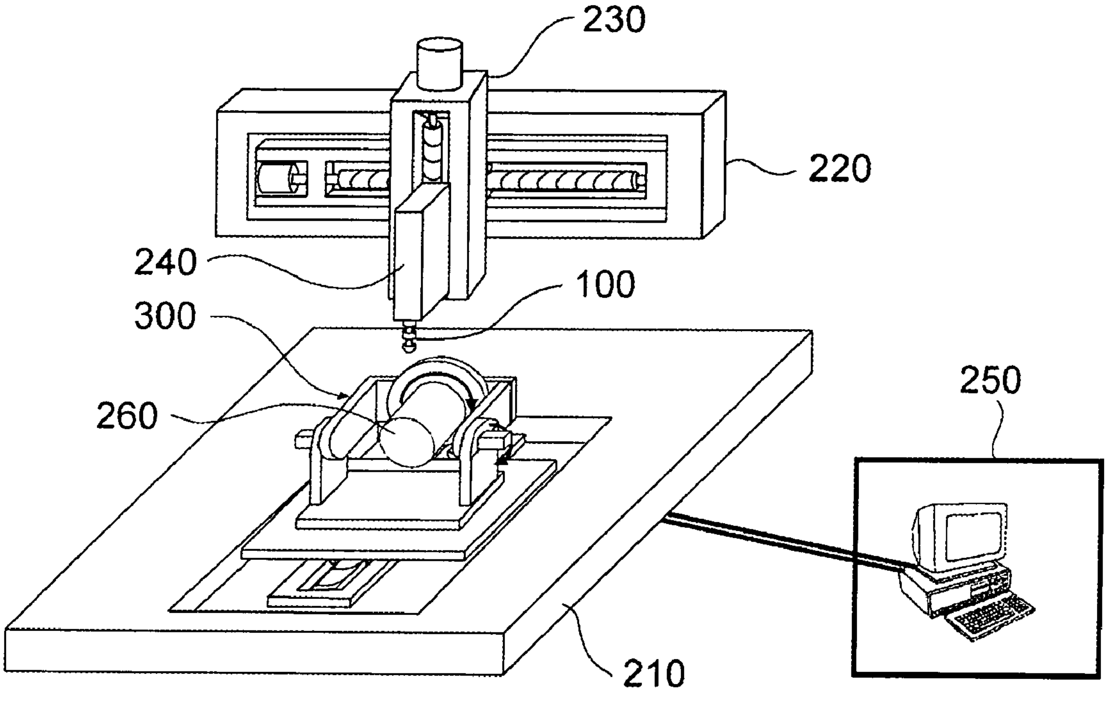
FIG. 4 is a shaping apparatus equipped with the heating tool of FIGS. 2*a* and 2*b*.

FIG. 3 is a view of a shaping process using the heating tool 100, and FIG. 4 is the shaping apparatus having the heating tool 100.

As described above, the heating tool 100 can completely thermally decompose the whole contact surface of the workpiece without generating undesirable wastes. In order to more efficiently perform a shaping process, the heating tool 100 may move along a moving path shown in FIG. 3 during the shaping process. In a detailed description, the heating tool 100 is positioned to be in contact with a surface of an object to be processed, that is, a surface of a workpiece 260. The heating tool 100 vertically moves along the surface of the workpiece 260 while shaping the workpiece 260. After a surface, namely, an XZ plane is processed, the heating tool 100 is moved in a direction of the Y-axis to be perpendicular to the processed surface, and then shapes another surface of the workpiece 260. When the heating tool 100 shapes the workpiece 260 while moving along such a moving path, the following advantages can be obtained.

First, the shaping parts 110 of the heating tool 100 move while being in contact with the workpiece 260, so that the loss of thermal energy is small. Second, the shaping process is rapidly executed. Third, molten material can be easily collected in the heating parts 120 of the heating tool 100. Therefore, in order to rapidly shape the workpiece 260, it is desirable that the heating tool 100 shape the workpiece 260 while moving along the path shown in FIG. 3.

FIG. 4 shows the shaping apparatus having the heating tool 100 includes a first feeding unit 210, a second feeding unit 220, a third feeding unit 230, an indexing table 300, and a control unit 250. The first, second, and third feeding units 210, 220, and 230 respectively move in three different directions. The workpiece 260 is placed on the indexing table 300 to be supported by the indexing table 300. Further, the control unit 250 controls the operation of the above-mentioned units.

The indexing table 300 supporting the workpiece 260 is seated on the first feeding unit 210. The first feeding unit 210 functions to move the indexing table 300 in a horizontal direction, namely, in a direction of the X-axis. The second feeding unit 220 is installed at a position which is spaced apart from the first feeding unit 210 by a predetermined height. The second feeding unit 220 functions to horizontally move the third feeding unit 230 to be perpendicular to the moving direction of the first feeding unit 210, namely, in a direction of the Y-axis. A vise 240 is installed at a predetermined position of the third feeding unit 230. The third feeding unit 230 is installed at a predetermined position of the second feeding unit 220 and functions to move the vise 240 vertically, namely, in a direction of the Z-axis.

The heating tool 100 is coupled to the vise 240. The vise 240 moves on a horizontal plane to be perpendicular to the moving direction of the first feeding unit 210 or moves down toward the first feeding unit 210, according to the operation of the second and third feeding units 220 and 230. Thus, the heating tool 100 held by the vise 240 moves horizontally along the X-axis by the first feeding unit 210 which moves the indexing table 300, and moves horizontally and vertically along the Y-axis and Z-axis by the second and third feeding units 220 and 230. As a result, the heating tool 100 has a 3-dimensional processing area relative to the workpiece 260 supported by the indexing table 300. In this case, the first, second, and third feeding units 210, 220, and 230 and the indexing table 300 are connected to the control unit 250 with or without a wire to be moved along predetermined paths. Further, the indexing table 300 helps the heating tool 100 to shape the workpiece 260. Such a shaping apparatus allows the workpiece 260 to be shaped in three dimensions.

As described above, the present invention enables to have a large area of a workpiece to be melted and thermally decomposed. Thus, the present invention prevents generation of wastes due to a shaping process, in addition to a rapid shaping process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It is therefore intended that the foregoing detailed description be regarded as illustrative rather than limiting, and that it be understood that it is the following claims, including all equivalents, that are intended to define the spirit and scope of this invention.

We claim:

1. A heating tool for shaping a soft material, comprising:

a shaping part contacting and melting the soft material to produce a melted soft material, the shaping part radially protruding from the center of the heating tool to contact the soft material; and a heating part for collecting the melted soft material produced by the shaping part and thermally decomposing the melted soft material, wherein the heating part does not contact the soft material.

2. The heating tool according to claim 1, wherein the heating part comprises a cavity provided in an inclined upper surface of the shaping part.

3. The heating tool according to claim 2, wherein the heating part contains the soft material melted by the shaping part therein.

4. The heating tool according to claim 1, wherein the shaping part and the heating part are arranged in a longitudinal direction at regular intervals.

5. The heating tool according to claim 2, wherein the shaping part and the heating part are alternatively arranged along longitudinal direction of the heating tool.

6. An apparatus for three-dimensionally shaping a soft material, comprising:

a feeding unit for moving in three different directions independently which are perpendicular to one another;

an indexing table for supporting the soft material in a manner that the soft material rotates relative to at least one axis; and a heating tool mounted to the feeding unit, the heating tool including:

a shaping part contacting and melting the soft material to produce a melted soft material; and a heating part collecting the melted soft material and thermally decomposing the melted soft material, wherein the heating part does not contact the soft material.

7. The shaping apparatus according to claim 6, wherein the feeding unit moves the heating tool in a manner that the shaping part of the heating tool shapes a surface of the soft material vertically and horizontally while being in contact with the surface of the soft material.

8. The shaping apparatus according to claim 7, wherein the feeding unit gradually shapes the surface of the soft material.

9. A heating tool for shaping a soft material, comprising:

a first tool contacting the soft material and changing a shape of the soft material;

a second tool disposed at a certain distance from the soft material and collecting the soft material; and a central support extending in a longitudinal direction, the central support being hollow inside:

wherein the first tool radially outwardly protrudes relative to the central support.

10. The heating tool according to claim 9, wherein the first tool and the second tool are integrally formed.

11. The heating tool according to claim 9, wherein the second tool is configured to contain the soft material after the first tool contacts the soft material.

12. The heating tool according to claim 11, wherein the second tool includes a cavity disposed on an upper surface of the first tool.

13. The heating tool according to claim 9, wherein the central support further comprises a heating device disposed inside thereof and emitting heat.

14. The heating tool according to claim 13, wherein the second tool is disposed adjacent the central support and the first tool is separated from the heating device by the second tool.

15. The heating tool according to claim 11, wherein the first tool includes a shaping part melting the soft material.

16. The heating tool according to claim 15, wherein the second tool includes a heating part collecting a melted soft material.

* * * * *